F. A. COLLINS, Jr.
BALL BEARING.
APPLICATION FILED JUNE 11, 1915.
1,219,920.
Patented Mar. 20, 1917.
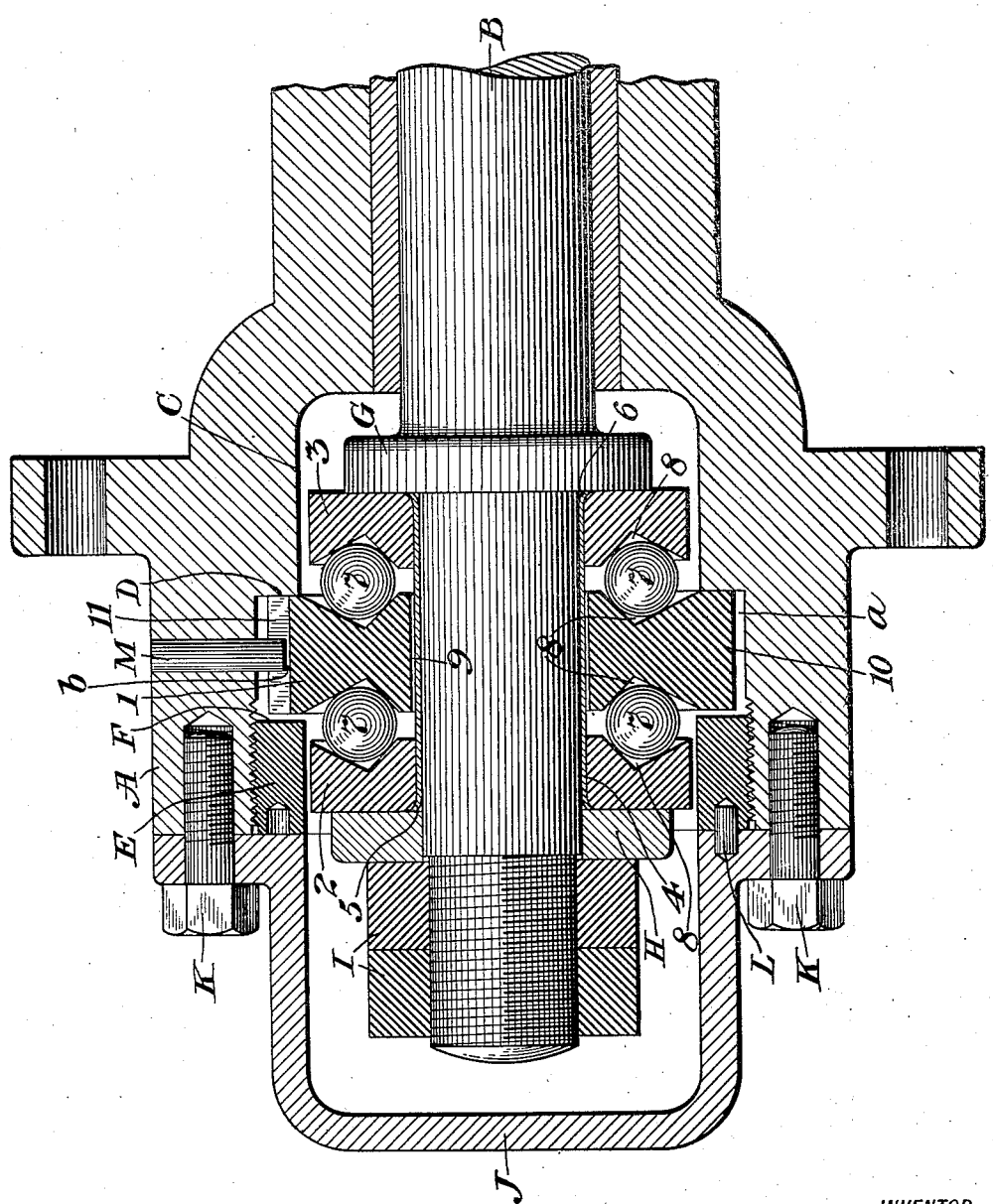
WITNESS
Chas. F. Clagett
INVENTOR
F. A. Collins Jr.
BY
Chas. F. Dawe
ATTORNEY

UNITED STATES PATENT OFFICE.

FRANCIS A. COLLINS, JR., OF ROCHESTER, NEW YORK, ASSIGNOR TO AUBURN BALL BEARING COMPANY, OF ROCHESTER, NEW YORK, A CORPORATION OF NEW YORK.

BALL-BEARING.

1,219,920.  Specification of Letters Patent.  Patented Mar. 20, 1917.

Application filed June 11, 1915. Serial No. 33,453.

*To all whom it may concern:*

Be it known that I, FRANCIS A. COLLINS, Jr., a citizen of the United States, and resident of Rochester, in the county of Monroe and State of New York, have invented certain new and useful Improvements in Ball-Bearings, of which the following is a specification.

The present invention relates to ball bearings, and has for its object to provide a double thrust ball bearing which is self-contained, and, therefore, capable of being handled and positioned as a unit, and which possesses the other characteristics herein-after described.

The invention consists in providing an intermediate annular race member and an end or extreme annular race member at either side of the intermediate race member. The intermediate race member projects radially beyond the outer cylindrical surface of the end race members to enable it to be braced against axial movements and to provide means for holding it against rotation. A sheet-metal cylindrical sleeve is passed through the central openings of the three race members and serves to bind the same together into a unit, said sleeve being rigidly secured to the end race members, but loose from the intermediate race member, whereby when the bearing is used in combination with a rotary shaft, the end race members may rotate with the shaft and the intermediate race member may remain stationary and serve to take the end thrusts of the shaft transmitted by means of the end race members.

The invention is illustrated in the accompanying drawing, which shows the improved ball bearing applied to a rotary shaft and inclosed in a suitable housing.

The intermediate race member is shown at 1, and the two end race members are shown at 2 and 3, respectively. All three of the race members are annular in shape and are connected together to form a unit by an internal sheet-metal sleeve 4, which passes through the central openings of the race members and is secured to the end race members by providing a close fit between the sleeve and the central openings of the end race members and also by turning over the edge portions of the sleeve, as indicated at 5 and 6. It will be noted, however, that the central opening of the intermediate race member 1 is larger than the central openings of the end ball race members to provide a clearance 9 between the sleeve 4 and the intermediate race member. The end race members may, therefore, rotate with the shaft when the bearing is installed and the intermediate race member being loose from the sleeve 4 may be held stationary.

The usual anti-friction balls 7 are provided between the race members and run in a suitably shaped raceway. The exact shape of the raceway is immaterial to the present invention, but as herein shown, they are formed by providing V-shaped grooves 8 in the working face of each of the end race members and in both faces of the intermediate race member. It is also immaterial to the present invention whether or not a cage or holder is provided for the balls 7, no such cage or holder being shown in the present instance.

The intermediate race member 1 projects radially beyond the outer surface of the end race members 2 and 3, as shown at 10, so that it may be engaged by a suitable part of the housing or other stationary part and thereby braced against axial movements. This bracing may be accomplished in various ways depending upon the type of housing employed, but for the purpose of illustration, one form of housing has been shown in the drawing and has been found to be very effective for producing the desired results. The housing is shown at A and is designed to receive the ball bearing when the latter is applied to a rotary shaft, such as that shown at B. The housing A is provided with an opening C to accommodate the bearing, said opening being so formed as to provide a shoulder D, against which the projection 10 of the intermediate race member may abut. When the bearing is positioned within the housing, the projecting portion 10 of the intermediate race member is made to abut the shoulder D of the housing and a retaining ring E is then screwed into the end of the opening C, so that its inner wall F coöperates with the shoulder D in providing a circular recess for the accommodation of the projecting portion 10 of the intermediate race member.

When the bearing is installed, it is preferable that the inner sleeve 4 should have a snug fit on the extremity of the shaft, so that the end race members 2 and 3 will rotate with the shaft. A flange G is shown on the shaft B, in the present instance, against which the race member 3 abuts. The other end race member 2 is abutted by a washer H held in place by means of the nuts I threaded on the end of the shaft.

The end of the housing may be closed by means of a cap J, which is bolted to the housing by means of the bolts K. Dowel pins L, which fit in recesses formed partly in the retaining ring E and partly in the cap J, may serve to lock the retaining ring E in place.

The intermediate race member 1 may be held against rotation by any suitable means, but preferably a transverse slot or opening 11 is formed at one or more points in the projection 10 to be engaged by the extremity of a dowel pin M.

When the bearing is installed, sufficient room should be left in the recess formed between the shoulders D and F for radial movement of the intermediate race member. This space or clearance is shown at $a$. It is also obvious that the depth of the opening 11 should be so chosen with respect to the length of the pin M as to provide a clearance $b$, also for the purpose of permitting radial movement of the intermediate race member 1. The race member 1, although braced against axial movement by the shoulders F and D, should not be held by these shoulders against radial movement. The purpose of the radial movement of the intermediate race member is to permit the same to accommodate itself to the position of the shaft. When the bearings of the shaft wear, the shaft is likely to change its position and move with it the end race members 2 and 3. As the intermediate race member 1 is permitted to move radially, this shifting of the end race members 2 and 3 will serve to move with them the intermediate race member 1, and, therefore, keep the latter centered in spite of changes in the position of the shaft. The radial weight of the intermediate race member 1 and the anti-friction balls 7 is cared for by the end race members 2 and 3, and, therefore, it is obvious that the intermediate race member will always be properly centered by the end race members.

From the foregoing, it will be obvious that the projecting portion 10 of the intermediate race member provides means whereby the intermediate race member may be held against axial movements. In the present instance, this is accomplished by making the said projecting portion 10 engage between the shoulders F and D. In the present instance, as the fit between the projecting portion 10 of the intermediate race member and the shoulders F and D is loose to permit radial movement of the race member 1, other means, in the form of the pin M and opening 11, must be provided for preventing rotation of the intermediate race member, in the event that it is desired to hold the intermediate race member stationary. As the three central openings of the race members are all substantially the same size, except for the clearance 9, an internal sleeve passing through these openings may be used instead of an external sleeve, and, as will be obvious from the foregoing description, this sleeve serves to bind the three race members together into a unit, so that the same may be readily handled and positioned.

The end thrusts of the shaft B are transmitted through the end race members 2 and 3, which rotate unitarily with the shaft, to the intermediate race member 1, and as the latter is braced against axial movements, it is obvious that these end thrusts will be effectively resisted.

Obviously, the ball bearing herein described may be used in combination with numerous different forms of housings, that herein shown being merely exemplary. Furthermore, numerous modifications and changes may be made in the structure of the ball bearing itself without departing from the spirit or scope of the invention, as defined in the accompanying claims.

What I claim is:—

1. An end thrust ball bearing comprising annular end race members, an annular intermediate race member, anti-friction balls between said end and intermediate race members, and means for securing the race members together as a unit, said intermediate race member being permitted to move radially.

2. An end thrust ball bearing comprising annular end race members, an annular intermediate race member, and anti-friction balls between said end and intermediate race members, said intermediate race member being provided with means whereby it may be held against rotation but permitted to move radially.

3. An end thrust ball bearing comprising annular end race members, an annular intermediate race member, and anti-friction balls between said end and intermediate race members, said intermediate race member being capable of radial movement, and means for holding the same against rotary movement.

4. An end thrust ball bearing, comprising an annular intermediate race member, an annular end race member disposed at either side thereof, anti-friction balls between said race members, and an internal sleeve passing through the central openings of the three race members and serving to bind the same together into a unit, the intermediate race member projecting radially beyond the outer surfaces of the end race members to permit it to be braced against axial movements, said radially projecting portion of the intermediate race member being provided with means whereby it may be held against rotation but permitted to move radially.

Signed at Rochester, in the county of Monroe, and State of New York, this 8th day of June A. D. 1915.

FRANCIS A. COLLINS, Jr.

Witnesses:
Thos. D. Patton,
Robt. J. Garrison.